United States Patent [19]

Elliott et al.

[11] Patent Number: 5,595,121
[45] Date of Patent: Jan. 21, 1997

[54] AMUSEMENT RIDE AND SELF-PROPELLED VEHICLE THEREFOR

[75] Inventors: Steven A. Elliott, Glendale; Ronald W. Froelich, Covina, both of Calif.; John W. Sogge, Orlando, Fla.

[73] Assignee: The Walt Disney Company, Burbank, Calif.

[21] Appl. No.: 228,106

[22] Filed: Apr. 15, 1994

[51] Int. Cl.⁶ .................................................. A63G 25/00
[52] U.S. Cl. ......................... 104/53; 104/288; 104/295; 105/30
[58] Field of Search ................................ 105/30, 32, 31; 104/53, 63, 64, 124, 125, 126, 289, 288, 295

[56] References Cited

U.S. PATENT DOCUMENTS

| | | | |
|---|---|---|---|
| 468,860 | 2/1892 | Wright | 105/30 |
| 3,530,800 | 9/1970 | Watkins | 104/168 |
| 3,675,583 | 7/1972 | Sobey et al. | 105/30 |
| 4,216,839 | 8/1980 | Gould et al. | 180/65 R |
| 4,726,299 | 2/1988 | Anderson | 104/88.02 |
| 4,791,871 | 12/1988 | Mowll | 104/88.02 |
| 4,794,865 | 1/1989 | Lindberg | 104/63 |
| 4,882,524 | 11/1989 | Lee et al. | 318/254 |
| 5,004,944 | 4/1991 | Fisher | 310/266 |
| 5,107,151 | 4/1992 | Cambier | 307/570 |
| 5,108,052 | 4/1992 | Malewicki et al. | 104/88.02 |
| 5,323,710 | 6/1994 | Manstrom | 105/30 |
| 5,408,935 | 4/1995 | Matsui et al. | 105/30 |

FOREIGN PATENT DOCUMENTS

| | | | |
|---|---|---|---|
| 9113662 | 9/1991 | WIPO | 104/53 |
| 9324196 | 12/1993 | WIPO | 104/53 |

OTHER PUBLICATIONS

French reference #331,244 (no date) drawings only.
*The Incredible Scream Machine: A History of the Roller Coaster*, by Robert Cartmell; Amusement Park Books, Inc. Bowling Green, Ohio (1987)—pp. 202–213 ("How Roller Coasters Work").

*Brushless DC Motors: Electronic Commutation and Control* by Thomas J. Sokira and Wolfgang Jaffe; Tab Books, Inc. Blue Ridge Summit, PA (1990)—Preface and Chapter 7 ("Applications and uses of BLDC Motors", pp. 218–225 and Chapter 9 (pp. 253–257).

(List continued on next page.)

*Primary Examiner*—Mark T. Le
*Attorney, Agent, or Firm*—Medlen & Carroll, LLP

[57] ABSTRACT

The present invention provides an amusement ride having a self-propelled electric powered ride vehicle capable of maximum acceleration of about 0.3 to as much as about 1.1 G's in either direction using a unique pinch wheel drive system, and including an on board vehicle controller and peripheral equipment for controlling the vehicle. The pinch wheel drive system, which compresses driven wheel motor packages against a tractive surface, generates compression using a system which is independent of the vehicle's weight and motion. A master controller is provided for ride systems having multiple self-propelled vehicles on the same track for communicating with and coordinating the movement of the ride vehicles. This allows precise control of multiple ride vehicles to allow faster dispatch and shorter intervehicular spacings by implementing a floating zone control. Electric power compatible with the on board propulsion and controllers can be provided to the ride vehicles in a conventional manner using an electric bus bar mounted along the track. A ride vehicle of the present invention is capable of generating thrills not previously available in conventional roller coaster or powered vehicle rides, such as the ability to apply reverse propulsion and generate high performance maneuvers in reverse. Additionally, the pinch wheel drive system of the present invention provides the ability to generate electricity during deceleration or while coasting down hill. This enables the master controller to space ride vehicles so that some are consuming electricity while others are generating electricity, thus providing a highly efficient and economical ride. Further, because of the high accelerations possible, equivalent or superior thrill can be obtained using tighter horizontal curves and shorter hills, enabling use of a track having a smaller footprint than is possible using conventional components.

54 Claims, 8 Drawing Sheets

OTHER PUBLICATIONS

US Safety Trolley Corp. Brochure and Drawing on "Power Rail Modem" which were furnished to applicants on request on Jul. 23, 1992.

"ICs Provide Control For Sensorless DC Motors," by Dave Peters and Jeff Harth, *EDN* Apr. 29, 1993, pp. 85–94.

*Radio Engineering Handbook,* Keith Henney, Editor–In–Chief, Fifth Edition (1959), pp. 19–105.

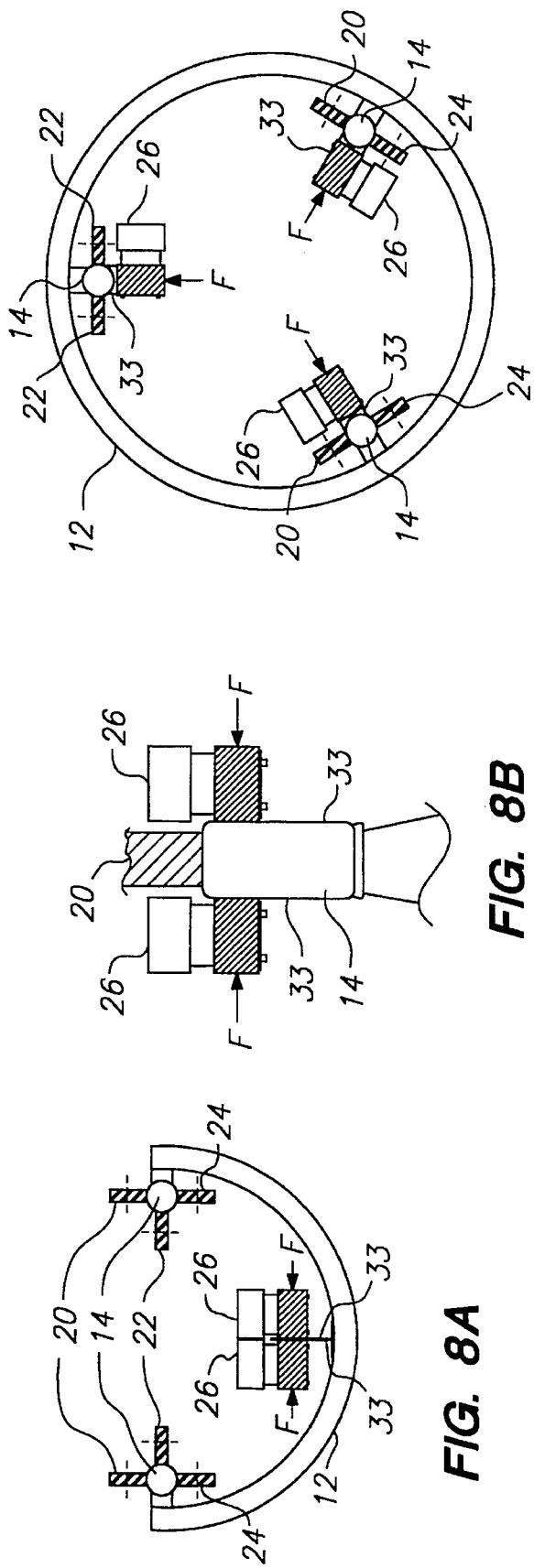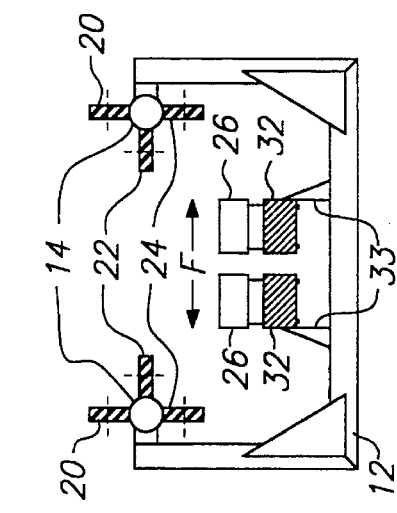

AMUSEMENT RIDE AND SELF-PROPELLED VEHICLE THEREFOR

FIELD OF THE INVENTION

The present invention relates to the field of amusement rides; more particularly, the present invention relates to an amusement ride incorporating a self-propelled electric powered vehicle.

BACKGROUND OF THE INVENTION

Self-propelled, electric powered vehicles are typically used in public transportation in light rail and municipal bus use. Electric power is desirable in these vehicles since they are easier to maintain and produce less environmental pollution than vehicles powered by fossil fuels. Improved motor and battery technology has made possible the development of light personal vehicles of limited usefulness, such as short range commuter automobiles. Electric powered vehicles have also found use in amusement rides. Some amusement rides feature self-propelled, electric, track mounted ride vehicles, such as those found in the "Journey into the Imagination" attraction in Epcot Center, Orlando, Fla.

However, conventional self-propelled electric powered vehicles, including amusement rides, suffer from defects which limit their usefulness. A major defect of many, if not all, conventional electric powered vehicles is low conversion efficiency. For example, light rail and municipal electric buses, utilizing overhead catenary wires, consume a large amount of electric power in their operation, but provide acceptable performance over normal terrain because they are not required to carry their power supply. Rather, such vehicles draw electricity from a convenient source disposed along the route typically using conventional bus bar technology.

The inefficient power and motor technology developed for light rail and municipal electric bus type vehicles, is generally not useful for smaller vehicles, especially those which have to carry their own power supply. Portable power supplies, such as batteries, are hampered by technology-inherent inefficiencies which produce a classic "catch-22": to obtain sufficient power to drive the vehicle, the battery must be large; when the battery is large, the weight added by the battery substantially degrades performance. Thus, small, individual electric vehicles which carry their own power supply are hampered by poorer performance, limited range, and the need for time to recharge their batteries.

Conventional electric vehicle amusement rides also suffer similar inefficiencies which limit the level of "thrill" the vehicles are capable of generating. Consumers and amusement ride enthusiasts typically compare electric powered ride vehicles to traditional roller coasters. In general, a more thrilling ride tends to be a more popular ride. Traditional coasters, which are not powered vehicles, achieve thrill by using low speed lift hills, steep drops, and high-speed turns. Tall lift hills and the length of the track required for high speed runout disrupt the esthetics of a themed environment and consume valuable real estate. A self-propelled ride vehicle is desirable because lift hills are not required. Therefore, the amount of track can be reduced, producing a smaller track footprint at a lower cost.

Conventional self-propelled ride vehicles typically use a platen drive. The total tractive effort from such a device is significantly limited by the weight of the vehicle and its payload (e.g., passengers) since that will be the maximum weight applied to the drive wheels to gain traction. This is undesirable because the component of the weight on the drive wheels which contributes to traction on the platen drive (that portion normal to the tractive surface) decreases when the vehicle is on an incline, a time when traction is most needed. Further, when the vehicle moves at speed over hill crests the reduced "G" forces reduce the load weight on the platen drive, thereby reducing the maximum tractive forces which can be applied. If a captive load-track or rail system is used and additional/higher force is applied to the platen drive surface, increased forces result between the vehicle wheels and the load rails which reduce vehicle performance.

Conventional self-propelled ride vehicles cannot provide a thrill equivalent to that experienced in a traditional roller coaster. More specifically, they cannot accelerate above about 0.3 G and travel at nominal driven speeds greater than about 30 mph. Further, their speed is typically achieved only after multiple passes around a relatively short track. Moreover, conventional vehicles cannot accelerate up a hill steeper than about 17 degrees (the arcsin of the ratio of a forward component of the gravitational force acting on the vehicle's mass), nor control acceleration to reverse or stop at any point on the track.

Accordingly, the need exists for a high performance, electric-powered, self-propelled amusement ride which can accelerate up hills steeper than about 17 degrees, and which is capable of providing a thrill which is equal to or greater than that experienced on a conventional roller coaster type amusement ride.

SUMMARY OF THE INVENTION

In order to provide new and greater thrills, the present invention provides a new, self-propelled vehicle for an amusement ride. This self-propelled vehicle provides for maximum accelerations above about 0.3 G up to as much as about 1.1 G or higher. This acceleration is desired to maximize thrill while remaining within current safety limits suggested by theme park operators for ride vehicle acceleration. Further, these thrills may be generated on a smaller footprint track, using much smaller velocities (about 35 feet per second) than are typically generated in conventional roller coasters.

In one embodiment, the present invention provides an amusement ride system including one or more self-propelled ride vehicles mounted on a modified coaster-type track. The coaster track is provided with a conventional pair of parallel, spaced apart load bearing rails positioned above a base or backbone by a plurality of spaced-apart rail supports. One or more conventional vertical, horizontal or compound curves are provided along the track. The track is modified by providing a substantially continuous drive fin along the track, preferably between the rails, for providing a tractive surface for the ride vehicle drive system. Stationary conductors, such as conventional electric bus bars, are disposed along the track to provide a source of electrical power for powering the ride vehicle. Power can be supplied to the stationary conductors using either conventional rotary equipment or solid-state equipment which typically draw power from utility service power lines.

Each ride vehicle is provided with a frame, at least one passenger compartment attached to the frame, a plurality of load bearing, guide, and upstop wheels to support, steer, and retain the vehicle on the load-bearing rails of the track, an electric pinch drive system for moving the vehicle along the drive fin, a vehicle control system for controlling the movement of the vehicle, and a conductor, such as an electric bus bar shoe, for transferring electrical power from the stationary conductors along the track to the drive and control systems.

The pinch drive system includes one or more pairs of drive motor packages, each drive motor package having a high performance, electric DC motor with an output shaft capable of operating at a power level of about 44 HP continuous, and 72 HP peak; a transmission for reducing the speed of the motor output shaft by a ratio of about 6.2:1; and a drive wheel attached directly to the transmission output shaft. The drive wheel includes a wheel rim provided with a tractive surface for engaging the drive fin. Each pair of drive motor packages is mounted on the ride vehicle so that when the load-bearing wheels of the vehicle are mounted on the track, the drive fin is interposed between the two drive motor packages of each drive package pair. A compressive coupler is used to link the two drive motor packages together and to compress the drive wheels of the drive motor packages against the drive fin interposed between them, to transfer driving forces between the vehicle and the track.

A vehicle of this embodiment also includes a vehicle controller, for interfacing with motor controllers for controlling the speed and direction of the vehicle on the track. The vehicle controller can also be used for monitoring and then controlling the location of the vehicle on the track, if the appropriate peripheral sensing input devices are provided for the vehicle controller to monitor.

When at least one drive motor package pair is provided for each axle used on a vehicle, the vehicle is capable of accelerating from at least about 0.3 G up to as much as about 1.1 G, in either a forward or a reverse direction.

Where it is desirable to mount multiple self-propelled vehicles on the same track, a master controller can be provided for precision control of the vehicles to allow faster dispatch and shorter intervehicular spacings by implementing floating zone control. Because the preferred drive motor packages of the present invention are capable of power regeneration during decelerating or when traveling down an incline, the travel of multiple vehicles on the track can be coordinated by a master ride controller such that while one or more vehicles are consuming electric energy, one or more other vehicles are regenerating electricity. This provides a more economical and energy-efficient amusement ride by reducing peak energy demand and recovering a significant portion of the energy that would otherwise be wasted, for example, as heat in braking.

It is an object of the present invention to provide an efficient, high performance, electric powered amusement ride including a self-propelled electric powered ride vehicle which can travel on a conventional coaster type track provided with sharp turns and steep slopes, and in which the ride vehicle can accelerate above about 0.3 G to as much as about 1.1 G in either a forward or reverse direction, enabling the vehicle to suddenly change directions while going up or down a steep slope or around a sharp curve, to provide the passengers with a thrill equivalent to or greater than that experienced on a conventional roller coaster.

It is a further object of this invention to provide an economical, energy efficient amusement ride in which the electric ride vehicles can produce electric power when decelerating or traveling downhill which can be used to provide at least some of the power being consumed by other ride vehicles as they accelerate or travel uphill.

These and other objects of the invention will become apparent from the Detailed Description of the Invention, taken in conjunction with the accompanying drawings, which illustrate, by way of example, the principles of the invention.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

FIGS. 1–8 illustrate an amusement ride of the present invention featuring a self-propelled, electric powered, track-mounted vehicle 16 of the present invention mounted on a conventional coaster-style track.

THE TRACK

Figure 1:
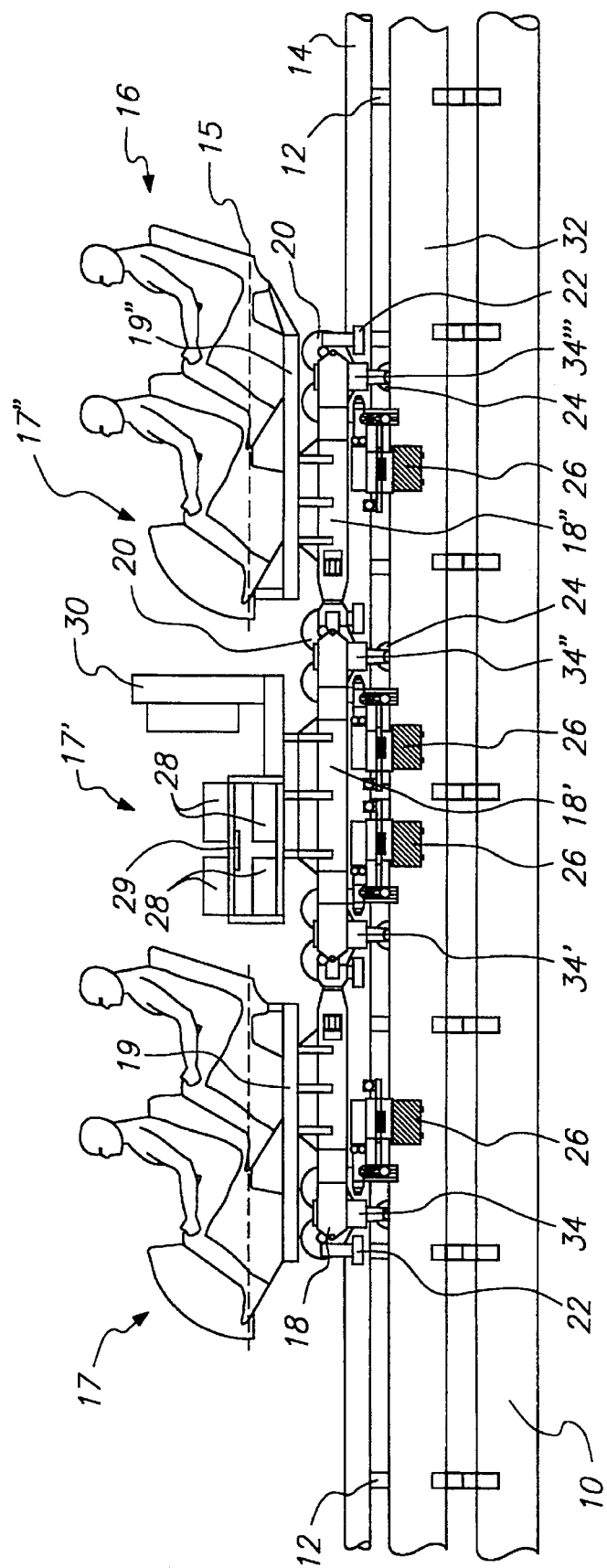
FIG. 1 provides a cross-sectional side view of the preferred embodiment of the present invention.
Figure 2:
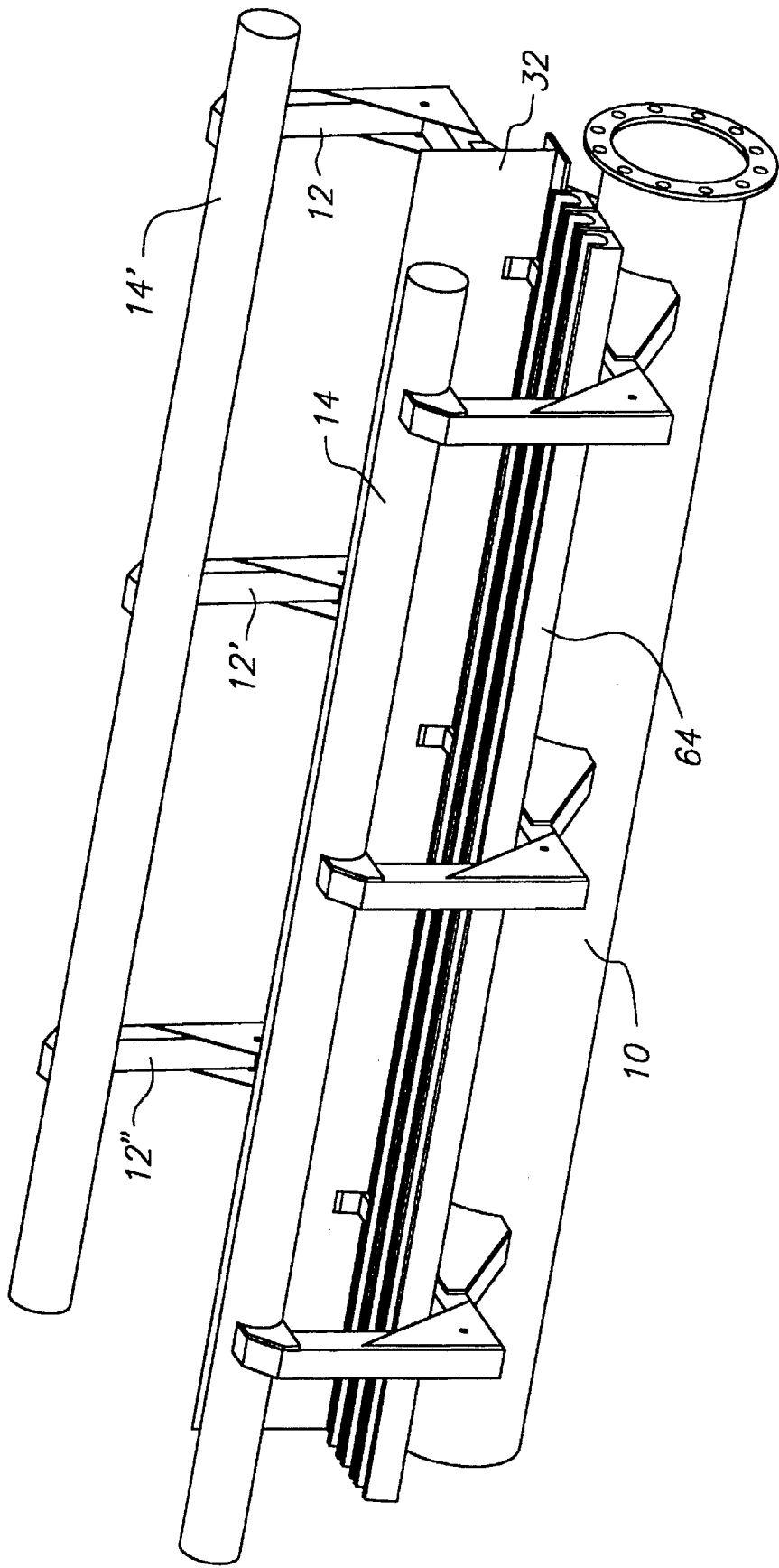
FIG. 2 provides a perspective view of a track section of the present invention.

The coaster-type railway or track, shown in cross-section from the side in FIG. 1, and in perspective in FIG. 2, preferably includes a base or backbone 10, load rail supports 12, 12', 12" (analogous to railroad ties) which rigidly support a pair of load rails 14, 14' above the backbone 10. These elements can be selected from proven, commercially available coaster components such as, for example, the Karl Bacon 48" gauge designs which are described in U.S. Pat. No. 3,889,605, which is incorporated herein by reference.

Figure 3:
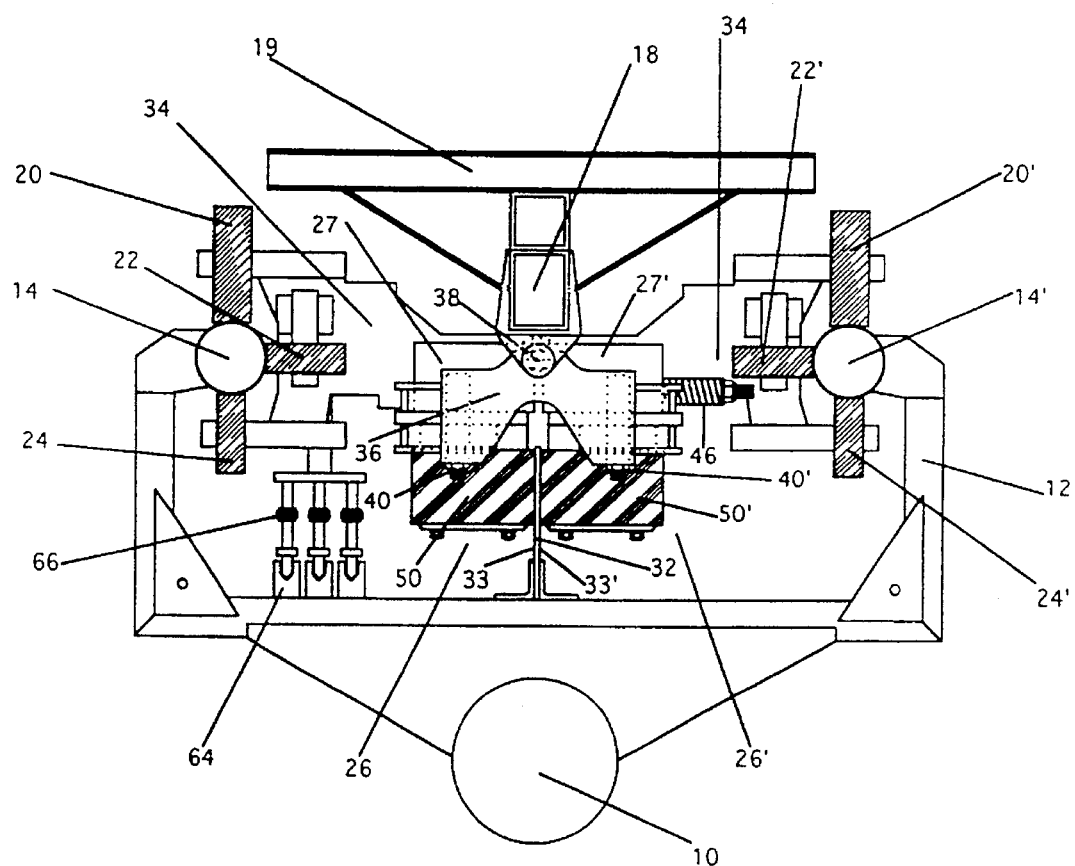
FIG. 3 provides a cross-sectional view of the front of a track-mounted vehicle of the present invention.

Because the preferred self-propelled vehicle of the present invention uses paired electric motors in a pinch wheel drive system for propelling the vehicle on the track, a tractive surface must be available for the pinch wheel drive system to engage. Because the preferred pinch wheel drive system, which is described in detail below, is intended to bear against a substantially flat tractive surface, a substantially continuous drive fin 32 is preferably provided along the track. While drive fin 32 can be oriented in almost any position along the track for engagement by the pinch drives, the drive fin 32 is most preferably positioned as shown in FIG. 3 so as to be substantially centered between and beneath the load rails 14, 14' and substantially vertical: that is, so that a plane passing through either of the substantially flat, opposing sides 33, 33' of the fin 32 is substantially perpendicular to the plane which passes through the top of both load rails 14, 14'. The drive fin 32 is preferably constructed from relatively thin steel, and is preferably substantially free of weld beads to provide a smooth, flat tractive surface for drive wheel 50 and 50'.

As shown in FIGS. 8A–8E, there are many alternative arrangements of track and tractive surfaces which can be used in the present invention. For clarity, these figures show only the tractive surface, track and the vehicle drive system components, discussed in more detail below, which interact with the track components, such as the guide wheels 22, load wheels 20, upstop wheels 24, and drive motor packages 26. The direction of the force exerted by the drive motors against the tractive surface is identified in FIGS. 8A–8E by an arrow and the letter F.

FIG. 8A illustrates an alternative embodiment using a track system with load rail supports 12 of arced construction similar to those described in U.S. Pat. No. 4,724,771.

FIG. 8B shows a cross-section of a different alternative embodiment using a rectangular load rail 14 in a monorail-type construction. In this embodiment, the substantially equal but opposite pinch forces F press the drive motor packages 26 towards the tractive surfaces 33 of the load rail 14 in pairs. Guide wheels (not shown) are needed to guide the vehicle along the track.

FIG. 8C depicts yet another alternative embodiment in which three drive motor packages 26 are pressed with substantially equal force F outwardly against a substantially flat tractive surface 33 of the load rails 14. In this embodiment, the drive motor packages 26 provide balanced motive force during vehicle motions. Load wheels and guide wheels (not shown) would preferably be positioned to engage the rails 14. As will be appreciated by those skilled in the art, the number of rails 14 in this embodiment (and the corresponding number of drive motor packages 26) can be expanded to four or more.

FIG. 8D illustrates a further embodiment of the present invention having two vertical, facing tractive surfaces 33 provided with a gap between them for accommodating a pair of drive motor packages 26 each of which press outwardly against the vertical tractive surface 33 closest to it.

FIG. 8E shows yet a further possible embodiment of the present invention in which each drive motor package 26 additionally functions to supplement the guide wheels 22 of the other embodiments. The load rails 14 are modified to provide a substantially flat tractive surface 33 for the drive motor packages 26. Substantially equal forces F are applied to press each drive motor package 26 towards its closest tractive surface 33.

Figure 7:
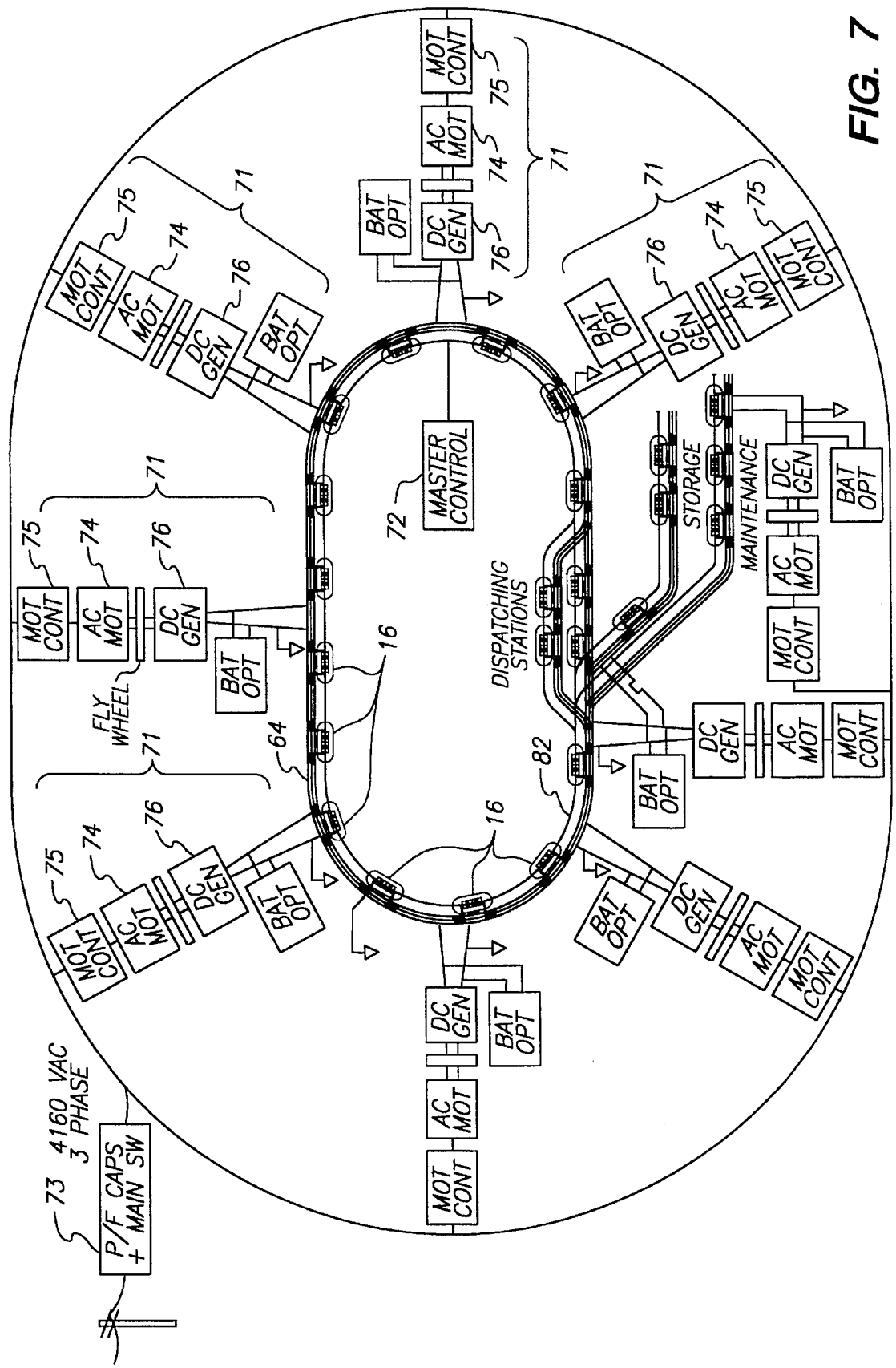
FIG. 7 provides a schematic illustration of an electric power system for a large track of the present invention; and, FIGS. 8A–8E provide cross-sectional views of alternative track and drive system combinations of the present invention.

To enhance thrill, the track is preferably provided with horizontal, vertical and compound curves and rolls such as those described, for example, in U.S. Pat. No. 3,889,605. As shown in FIG. 7, the track can also be provided with sections for loading and unloading passengers, for storage of ride vehicles not being used, and for maintenance of ride vehicles.

The track can be laid out in a conventional, closed-loop design having a single location for loading and unloading. Alternatively, a length of track having a different starting and stopping position can be provided since, as will be explained below, the ride vehicles can operate with equal efficiency in either direction. The track can be provided with a single route which every ride vehicle traverses, or can be provided with one or more alternative paths which may be selected by the passengers, or by a master controller, to provide variations in what is seen and experienced by the passengers during the ride.

THE VEHICLE

As shown in FIGS. 1 and 3, a self-propelled vehicle of the present invention includes a frame 18, a passenger platform 19 mounted on the frame 18, a plurality of load bearing wheels 20, 20' for carrying the weight of the vehicle 16, guide wheels 22, 22' for preventing the vehicle 16 from slipping laterally off the load rails 14, 14', up-stop wheels 24 for preventing the vehicle 16 from moving vertically off the load rails 14, and axles 34, 34', 34", 34''' for connecting the load wheels 20, 20', guide wheels 22, 22' and up-stop wheels 24, 24' to the frame 18.

The Frame

As shown in FIG. 3, the vehicle frame 18, typically a large beam, is preferably centered on the axles 34 between the load wheels 20, 20'. Frame 18 is most preferably about 60 inches long, to allow for clearance of vertical and horizontal curves in the track. As shown in FIG. 1, the frame 18 links the axles 34, 34', and supports the passenger platform 19 and other vehicle components, such as the drive motor packages 26. Multiple frames 18, 18', 18" can be linked together to form vehicles having multiple cars 17, 17', 17", and vehicle weight savings can be achieved by sharing axles as shown in FIG. 1 and described below. Further, a vehicle 16 with multiple cars 17, 17', 17" permits a desirable increased separation between the passengers and certain vehicle components, such as the cooling system 30.

The Axles

Figure 4:
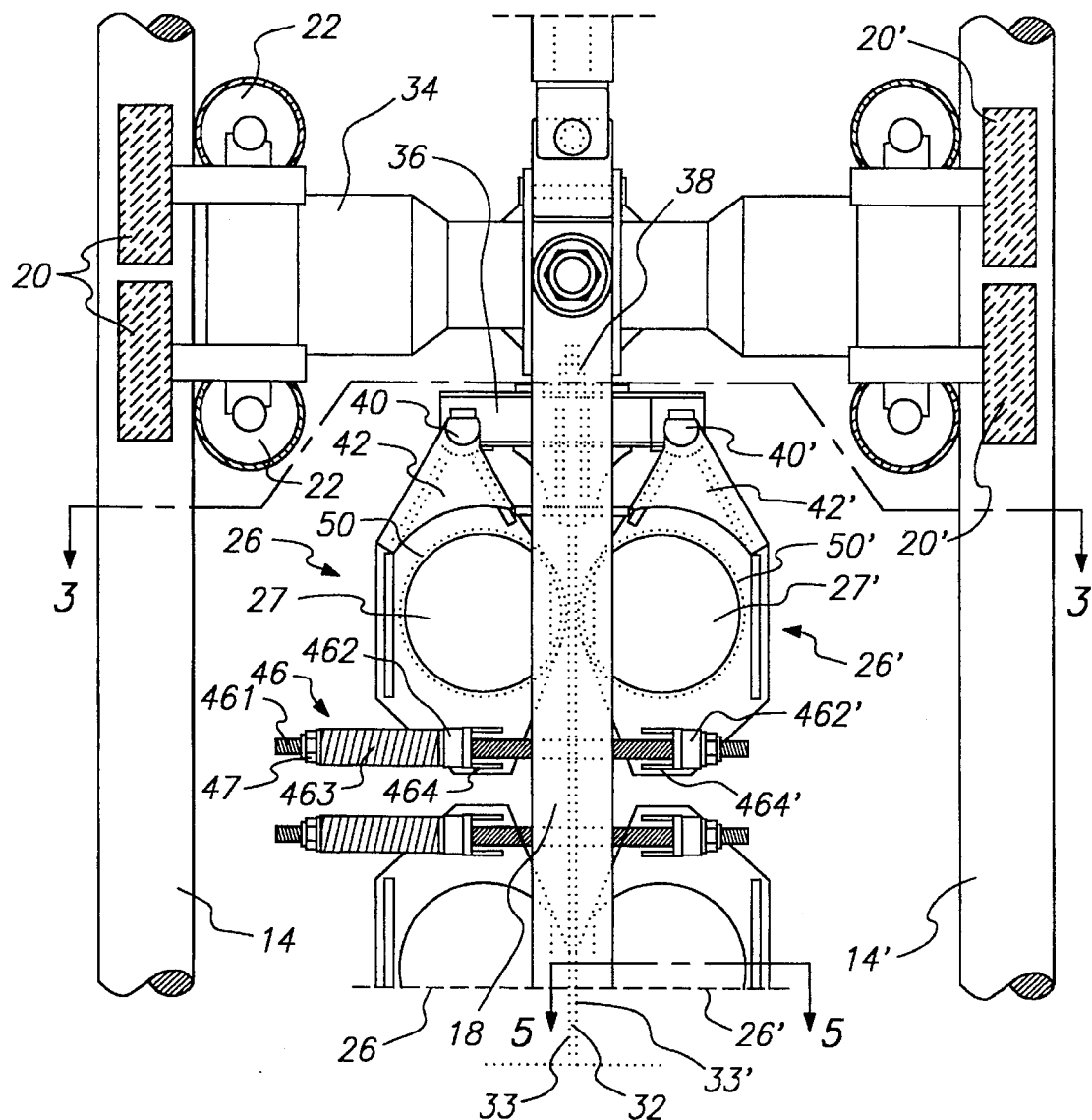
FIG. 4 provides a top view showing the position of elements of a pinch wheel drive system of the present invention.

The axles 34, as shown in FIGS. 3 and 4, are preferably similar to those made by Vekoma International for their 1200 mm gauge track system and by Arrow Dynamics, Inc. for their "Corkscrew" 48 inch gauge track system. Such axles weigh about 500 pounds and can carry approximately 2000 pounds of payload. The center of each axle can be provided with a rigid or jointed attachment to the frame 18. In the preferred embodiment, shown in FIG. 1, four axles rated to carry about 2000 pounds of payload each are used: one at the front of car 17, one at the front of car 17' near the intersection between cars 17 and 17', one at the rear of car 17' near the intersection between cars 17' and 17", and one at the rear of car 17".

The Passenger Compartment

As shown in FIG. 1, each vehicle 16 is preferably provided with two passenger cars 17, 17", each of which is attached to a passenger platform 19, 19" linked together via a propulsion and control car 17'. The passenger cars 17, 17" are preferably capable of holding at least about four adult passengers in each car. A bench seat can be provided for each pair of passengers, or alternatively, individual seats can be provided for each passenger. A restraining means (not shown), such as seat belts or lap bars, is provided to prevent passengers from being thrown from the vehicle during operation. If individual seats are provided, such seats can be mounted on a seat pivot point 15 and made selectively positionable during travel so that each individual passenger can adjust the orientation or tilt of his or her seat relative to the frame 18. This ability to control the tilt of the seat will enable each passenger to increase or decrease the relative G-force experienced when the vehicle is traversing horizontal, vertical, or complex curves. Alternatively, an on-board controller could dynamically set the orientation or tilt of the seat throughout the ride to enhance or minimize the G-forces experienced by the passenger.

The Drive Motors

As shown in FIGS. 1, 3, and 4, a plurality of drive motor packages 26 are provided for moving the vehicle 16 along the drive fin 32. In the preferred embodiment, the drive motor packages 26 are paired to form a pinch drive system.

Figure 5:
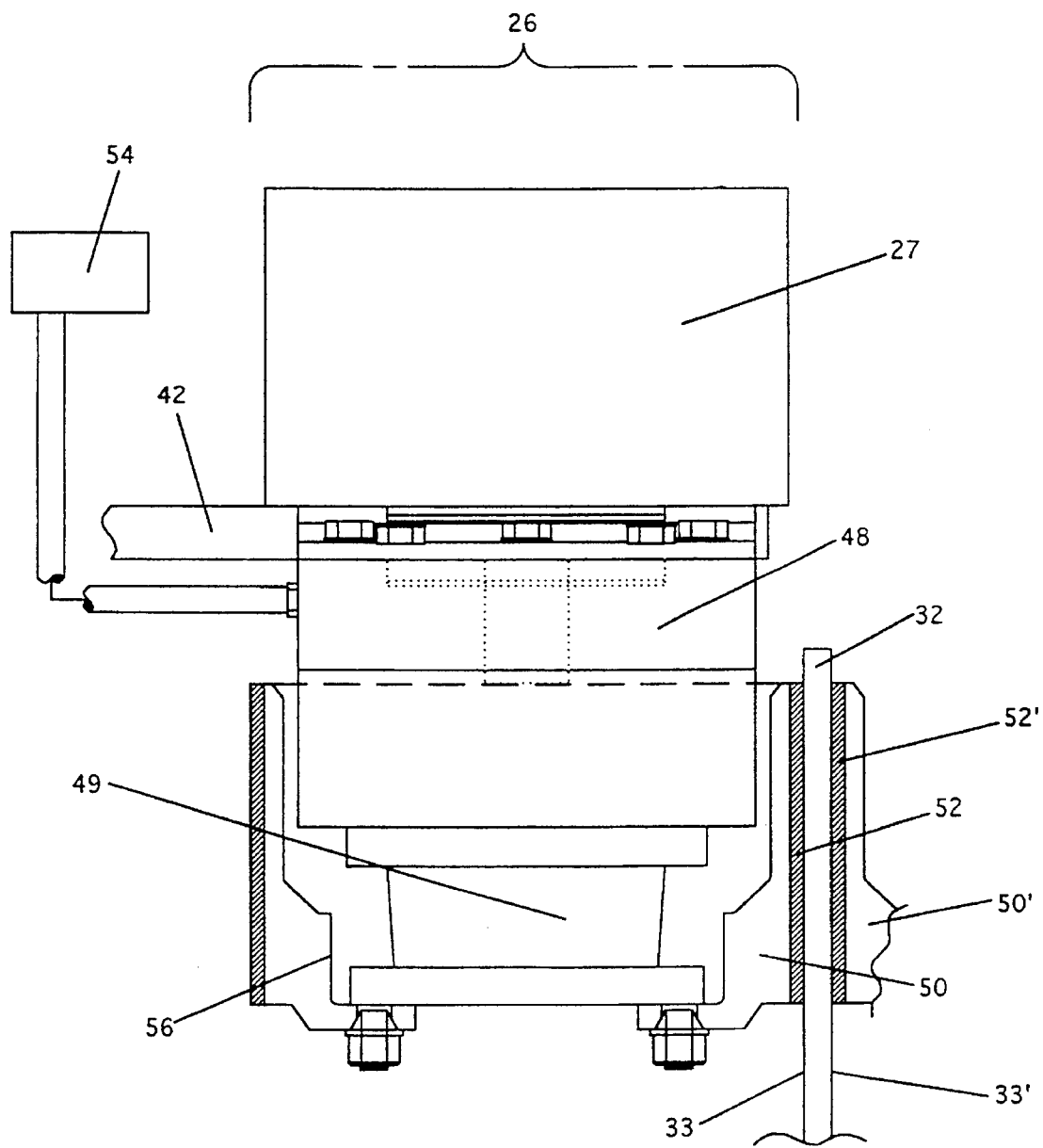
FIG. 5 provides a cross-sectional view of the front of a drive motor package.

As shown in FIG. 5, each preferred drive motor package 26 comprises three parts: an electric motor 27 with an output shaft which can rotate with substantially equal performance in either direction; a transmission 48 for reducing the speed of the motor output shaft by a ratio of about 6.2:1; and, a drive wheel 50 directly attached to the transmission output shaft.

The drive motor 27 is preferably a light weight electric DC motor capable of continuously operating at a power level of about 44 HP, and having a peak output power level of about 72 HP. The preferred drive motors are also optimized to operate with equally high efficiency when thrusting in either direction. This enables both acceleration and deceleration by the drive motor package 26, and enables the motor 27 to function as a primary brake. Furthermore, the motor 27 can be operated in an energy regenerating manner (i.e., feeding power back into its energy source) when decelerating (i.e., braking) or when rotation of the output shaft is induced or enhanced by gravity (e.g, when the vehicle is rolling downhill).

The drive motor 27 generates shaft rotation which is directly connected to the transmission 48 via a shaft/spline connection. The drive motor 27 and transmission 48 are each bolted to a mounting flange plate 42 which transmits force from the compressive coupler 46 to the drive motor package. The output shaft 49 of the transmission 48 is bolted to the drive wheel 50, which transfers the reduced shaft speed coming from the drive motor 27.

The drive wheel 50 includes a tractive wheel surface 52 such as a polymeric layer, for engaging the drive fin 32. In the most preferred embodiment, the tractive wheel surface 52 is a tire, made of a durable material such as Thornbert, Inc's DYALON B®, which is molded and attached to the drive wheel's outer surface. To enable the tire 52 to readily dissipate heat and avoid melt-down, the tire 52 is preferably relatively thin. The optimum thickness in the most preferred embodiment using DYALON B® is approximately ¼ inch as molded (not compressed). Drive wheel 50 can also be provided with a braking surface 56 for an optional drum brake unit (not shown) which may be used to statically lock the drive wheel 50 (and vehicle) in position.

The tire 52 is placed in direct contact with the drive fin tractive surface 33 which is on the drive fin 32. A complementary tire 52' of a drive wheel 50' is placed in contact with tractive surface 33' of drive fin 32 opposite the tire 52, to form the other half of the drive motor package pair.

As noted above, the most preferred embodiment includes a substantially flat tractive surface 33, 33' on either side of fin 32. By providing a substantially flat tractive surface, the tire 52 will be substantially evenly loaded across the line of contact with the tractive surface on the fin 32. This will provide at least two benefits: (1) even distribution of stress; and (2) even distribution of tractive effort, so that one portion of the wheel is not slipping with respect to another, and the strain in the direction of motion is constant. This enables the tire to avoid failures related to excessive stress, such as excessive heat build up, cracking, checking, and pulverizing of the tire material.

Because of the limited space between the load rails 14, the load rail supports 12, the drive fin 32, the vehicle axles 34, the frames 18, and the passenger platforms 19, the size of the drive motor packages 26 is significantly constrained. Components of the drive motor package cannot intrude on the space occupied by the drive fin 32. Further, when the track is provided with various horizontal, vertical and compound curves and rolls for enhanced thrill, relative movement of the vertical drive fin and frame as the vehicle traverses the track will further constrain the envelope of the drive motor package in the inboard areas (toward the fin 32). In general, it is satisfactory that the housings for the drive motor 27 and transmission 48 to maintain diameters less than that of the drive wheel 50 (see FIG. 5). Most preferably, the drive wheel 50 is about 10 inches in diameter and the drive motor package diameter is about 9.5 inches. This provides clearance on the vehicle in the outboard direction (away from the fin) as well as fore and aft of the pinch wheel drive motors, for plumbing, electrical and mechanical interfaces.

Consideration must also be given to the height and position of each drive motor package in the drive motor package pairs, since vehicle 16 will traverse track with vertical and horizontal curvature simultaneously or sequentially. Because of the vertical curvature of the track in crests and valleys, if drive wheels 50 are located anywhere other than precisely beneath the axles 34, less than the full height of the drive fin 32 may be available for use. For example, at a crest, the bottom of the drive fin 32 moves closer to the frame 18 because the frame 18 parallels a chord between the two axles 34 relative to the fin 32. Similarly, through a valley, the top of the fin 32 falls away from the frame 18. Both of these effects, and the proportional versions of them at different positions away from the axles 34, define a contact envelope beneath the vehicle where the drive wheel 50 can contact the drive fin 32 without concern for running off the top of the drive fin 32 or colliding with the support structure at the bottom of the drive fin 32. Since the contact envelope is widest immediately below the axle, and narrows as the distance from the axle grows, it is preferred to mount the drive motors 26 as close to the axles 34 as possible. However, the desirability of having the drive motor packages close to the axle for maximum fin contact area must be balanced against another constraint: to maintain clearance between the drive motor package and the axle as it yaws, pitches and rolls through the various curves on the track. Therefore, in the preferred self-propelled ride vehicle, in which the frame 18 is 60 inches long, the optimal position for each drive motor package 26 is approximately 18 inches inside either axle 34. Positioning the drive motor package 26 further away from the axle 34 reduces the allowable height of the tractive surface of drive wheel 50 (which increases stress on the material used to form the portion of wheel 50 which is tire 52) while positioning the drive motor package 26 closer to the axle 34 intrudes on the relative motion envelope of the axle 34.

The preferred jointed suspension for mounting the preferred drive motor packages 26, 26' to a vehicle of the present invention is shown in FIGS. 3 and 4. A mounting bracket 36 can be attached to the frame 18 by means of a horizontal pivot pin 38 which permits the mounting bracket 36 to rotate about the horizontal pivot pin 38. This permits changes in the vertical position of the drive motor packages 26, 26' relative to the frame 18. As shown in FIG. 4, the drive motors 27, 27' are preferably attached to a mounting flange 42 which can be connected at one end of mounting bracket 36 using a vertical pivot pin 40, which allows for movement of the drive motor packages 26, 26' horizontally about drive fin 32. The combined pivoting movement provided by the pivot pins 38, 40 allow the drive motor package to follow the drive fin through horizontal, vertical and compound curves.

Each drive motor package 26 forms a lever, with its fulcrum at vertical pivot pin 40, in the embodiment shown in FIG. 4, its load positioned on the centerline of the drive motor package 26, and its work point at the bracket 464. For a given arrangement, the work point at the bracket has a mechanical advantage over the load point at the drive motor package centerline with respect to the fulcrum at the pivotal mount. The base necessary compressive force (BNCF) on the bracket 464 can be calculated by dividing the required force compressing the drive wheel 50 to the fin 32 to prevent breaking traction by the bracket's mechanical advantage.

The compressive force applied to the drive wheel 50 should additionally account for centripetal forces acting on the drive system. These forces arise when the drive wheel 50 is on the outside of a lateral curve, causing the mass of the drive motor package, mounting flange, and bracket to undergo a centripetal acceleration component, directed away from the fin 32 and drive surface 33. This reduces the compressive force on the drive wheel, and may be calculated in advance by knowing the mass of the drive motor package, mounting flange and bracket, the mechanical advantage over the compressive coupler of the centroid of the mass relative to the pivotal mount, and the maximum speed-curvature product. The centripetal acceleration component is added to BNCF on the bracket to yield the specified compressive force. Note that the specified compressive force may be different for different drive wheels due to variations in mechanical design.

It is, of course, possible to dynamically alter the compressive force on each drive motor package to compensate for dynamic centripetal load variations. Such a dynamic system could also compensate for forces developed by the self-loading action of the drive motor package which varies dynamically with drive force and direction. Lateral acceleration sensors and torque control signals from the motor controller (discussed below) could be used to modulate the compressive force.

In the preferred drive motor package pair, as shown in FIG. 3, two drive motor packages 26, 26' are pivotally mounted under frame 18 so that the drive wheels 50, 50' extend vertically downward on opposing sides of the drive fin 32. A compressive coupler 46 provides the compressive force which compresses the tractive surfaces of the drive wheels 50, 50' against the tractive surfaces 33, 33' on opposed faces of the drive fin 32. When the drive wheels 50, 50' are rotated against the tractive surfaces 33, 33', the vehicle is moved on the load rails 14.

As shown in FIGS. 3 and 4, the compressive coupler 46 is provided at the other end of the mounting flange 42 to compress the drive wheels 50, 50' against drive fin 32. Because a compressive force can be generated as a torque around pivot 40 when drive wheel 50 is under torque, pivot 40 is preferably placed as close as possible to the axis of the drive wheel 50, since if the pivot is directly in line with the axis of the drive wheel 50, then no additional force is generated. If the pivot 40 is outside of the drive wheel axis (further from the frame), then when the drive wheel 50 drives toward the pivot pin 40, additional force will compress the drive wheel 50 towards the vertical drive fin 32. If the pivot pin is located inside the drive wheel axis (closer to the frame), driving toward the pivot will reduce the compressive force forcing the drive wheel 50 towards the vertical drive fin 32. Because of limitations in the strength of pivot 40, the pivot is preferably placed slightly outside the drive wheel axis.

The preferred compressive coupler 46, as shown in FIG. 4, includes a threaded shaft 461 attached by a ball joint 462 riding in first bracket 464 mounted on flange 42'. The opposite end of the threaded shaft 461 passes through a second ball joint 462' and a second bracket 464' mounted on flange 42. A compression spring 463 is mounted over the end of shaft 461 as shown in FIG. 4, and is retained in place by a washer (not shown) and a nut 47. The spring 463 is compressed by rotating the nut 47 in a first direction which moves the nut on the threaded shaft 461 towards the second ball joint 462'. This tightening of the nut 47 is transferred as a compressive force on the first drive wheel 50 against first tractive surface 33 and a substantially equal but opposite compressive force on second drive wheel 50' against the second tractive surface 33'.

Alternatively, the desired compressive force on each drive wheel can be supplied by another device, such as a pneumatic cylinder (not shown), mounted between, for example, the mounting flanges 42 and 42' to force the drive wheels 50, 50' into engagement with tractive surface 33, 33'.

The preferred embodiment maintains the constant level of compressive force save lateral centripedal load variations, such that the tractive effort and the drive wheel tread compression forces are separate and distinct from the dynamics of the vehicle. In the preferred embodiment, the drive system makes substantially no contribution to the guidance or load carrying capacity of the vehicle. In the preferred embodiment, the drive motor packages only provide for the motive force of the vehicle and account for their own operational dynamic forces, not those of other vehicle components and parts.

With the preferred pinch drive system described above, and the other preferred components described herein, the present invention provides a ride vehicle having a "performance ratio" (PR) which can be greater than unity (1:1). This allows the vehicle system to provide a thrill which can be contradictory to that of a conventional roller coaster type amusement ride; for example, the preferred drive motor packages and other ride vehicle components of the present invention permit a ride vehicle of the present invention to accelerate uphill and to reverse direction. An acceleration at the proper moment on a small hill or in a valley can provide a thrill similar to a much larger and faster coaster ride. The unique nature of these and other possible maneuvers produces experiences in direct contrast to those experienced on today's roller coaster systems. As a result, the thrill experience is heightened.

Performance Ratio, or "PR", is defined herein as the ratio of total effective tractive force in pounds divided by the total gross weight of the vehicle[1] in pounds. For any given slope, an adequate PR satisfies the equation PR>SIN θ, where "θ" is the angle above horizontal of the slope. For a vertical slope, SIN θ is SIN 90 degrees, and is equal to 1. Thus, for an amusement ride which includes a vertical slope, PR should be greater than unity, and should be sufficiently greater so as to provide the significant acceleration or deceleration. It is desirable for the residual performance ratio, defined as (PR−SIN θ), to be at least about 0.1, which would provide about 0.1 G of acceleration or deceleration in operation against gravity while on a slope of angle θ.

[1] The gross weight of the vehicle includes everything born by the vehicle's load wheels, including axles and shafting, all bogies, bearings, wheels, rims, and tires, both weight-bearing and driving, all framework, motors, transmissions, controllers, radiators, pumps, and fluids, all people, their seats and harnesses, all bus-bar shoes and related framework, all other special purpose vehicle structure if any, any vehicle brakes if used, and all vehicle decorative skins and trim.

Another preferred performance feature is that the vehicle be able to achieve a sufficient maximum velocity. Maximum velocities in the range of 20 to 80 or more miles per hour are desirable, so that an amusement ride will be perceived as thrilling.

In order to meet both the preferred PR and the maximum velocity performance standards, three criteria must generally be simultaneously met. First, the drive wheel of each drive motor package, and its associated tire, must operate at a compressive force greater than the drive wheel's share of the total tractive force divided by the coefficient of friction between the tire and a tractive surface. Since the friction between typical tire materials (e.g. DYALON B® made by Thombert, Inc., Newton, Iowa) and typical tractive surfaces (e.g. steel) is less than one (in this example 0.52), the compressive force holding the drive wheel tire against the tractive surface must be almost two times the tractive force to be exerted by the drive wheel. Any less compressive force would let the drive wheel slip, or "burn rubber", causing damage to the wheel and a reduction in the tractive force.

Second, the total available tractive effort in horsepower on board the vehicle should be equal to or exceed the minimum value required for vehicle horsepower. This minimum vehicle horsepower can be computed from the formula for required vehicle horsepower which is:

required vehicle horsepower =

$$\frac{(motor\ speed)(motor\ shaft\ output\ torque)(number\ of\ motors)}{(5250)(motor\ mechanical\ and\ electrical\ efficiency)}$$

Where motor speed is in RPM and motor shaft output torque is in foot-pounds. The motor shaft output torque is further computed from the expression for torque, which is:

motor shaft output torque =

$$\frac{(total\ wheel\ tractive\ force)(drive\ wheel\ radius)}{(transmission\ ratio)(transmission\ \&\ wheel\ mechanical\ efficiency)}$$

Where total wheel tractive force is in pounds and the radius of the driving wheel is in feet. Motor mechanical and electrical efficiency for any given motor and transmission and wheel mechanical efficiency for any given transmission/wheel combination can be determined from a test stand or obtained from the manufacturer.

As can be seen from the equations, the most efficient way to produce both the necessary tractive effort and maximum speed desired is by selecting motors capable of providing the required vehicle horsepower, such as the preferred motor described above. A large transmission step-down ratio in the drive motor package can be used to generate the necessary tractive force, but this will limit the maximum speed which can be generated by that same ratio. As noted above, reducing the maximum speed will reduce thrill. While this limitation can be addressed to some extent by using multiple ratio or variable ratio transmissions to gain a high end speed improvement and yet still have a reasonable low end, such more complicated transmissions reduce vehicle efficiency due to the additional weight and mechanical losses. Higher speed amusement vehicle designs may use a small transmission ratio to achieve 30 to 80 mile per hour peak speeds. However, unless the previous conditions are satisfied, the vehicle will not have sufficient reversing tractive force to stop on a slope. Thus, it can be seen that the most efficient, and preferred, way to produce both the necessary tractive effort and maximum speed desired is by providing the appropriate vehicle horsepower.

Proper transfer of tractive effort between a vehicle and its track is critical. Even a vehicle having sufficient horsepower and the proper transmission ratio to achieve vehicle speed and performance as defined above will not achieve the performance requirements unless the tractive force can be transferred between vehicle and track. A structure for transferring the tractive effort is most preferably independent of gravity, attitude of the vehicle, and speed. The preferred compressive coupler discussed above meets these requirements.

Third, the above equations clearly illustrate the importance of a sufficiently low total gross vehicle weight. This can be achieved by carefully matched selections for the motors, transmissions, wheels, vehicle structure design, passenger count, and other vehicle equipment, as discussed herein.

In the preferred embodiment, as shown in FIG. 1, a drive motor package pair is provided for each axle 34. These are preferably distributed so that drive car 17' contains two drive motor package pairs near the two axles 34', 34" mounted at either end of frame 18', passenger car 17 is provided with one drive motor package pair for axle 34, and passenger car 17" is provided with one drive motor package pair for axle 34'". This arrangement provides sufficient power to allow the acceleration of vehicle 16, when fully loaded, to more than about 0.3 G up to as much as about 1.1 G. Further, the drive motor package pairs when mounted in this configuration should provide sufficient power to lift the entire mass of vehicle 16 and its payload up a slope of approximately 90 degrees.

There are, of course, other ways of driving the vehicle along the center fin which do not involve the compressive forces required in the preferred embodiment. For example, one could use a rack and pinion type of mechanism for coupling the traction forces between the vehicle and track. In this alternative embodiment, the driving wheels discussed above would be replaced with a pair of pinion gears. These pinion gears would directly engage the teeth in a pair of continuous, linear, gear tooth racks, with one rack mounted on each side of the fin. By using a nearly square tooth style on the rack and gear teeth, the force required between the coupled pinion gears would be substantially reduced. In order to permit the gears to have a maximized tooth line of contact on hills, valleys, and curves, the gear teeth would need to be specially curved. Audible gear noise could be reduced by coating the gears and/or gear racks with plastic coated materials such as nylon or an ultra-high molecular weight plastic. While wheel life in the preferred approach is limited by checking, cracking, and abrading of the wheel tread, the life of the alternative embodiment using gear and rack would likely be limited by wearing off of the plastic coating on the gear or rack teeth. This alternative rack and pinion embodiment provides an added safety feature that under emergency stopping conditions, the rack and pinion design should never slip.

Motor Controllers

A motor (or drive power) controller 28, shown in FIG. 1, is preferably provided for operating and controlling each drive motor package 26. Motor controllers 28 can be conveniently located on propulsion and control car 17' where each can be operatively linked to its drive motor package 26 and where all can be linked to an on-board vehicle controller 29 using conventional wiring. Motor controllers 28 can be provided with compatible electrical power for operating the drive motors 27 by a wiring harness which connects them with a power pickup such as bus bar shoe 66, shown in FIG. 3.

Cooling System

As shown in FIG. 1, a cooling system 30 can be provided for dissipating the heat produced by the drive motor packages 26 during operation. Water or another liquid coolant is preferably used to conduct the heat to a forced air radiator cooling system 30 which can be conveniently mounted on propulsion and control car 17'. The cooling system preferably provides flow rates of at least about 1 gallon per minute for the exclusive use of each motor. The cooling system is most preferably a closed system which is designed to withstand the G-forces which occur during operation of the vehicle.

Vehicle Controller

An on board vehicle controller 29, as shown in FIG. 1, is preferably provided for communicating with and controlling the motor controllers 28 for precision control over the speed and direction of vehicle travel. The on board vehicle controller 29 can also be used to determine the position of the vehicle on the track when appropriate sensing or location pickup devices (not shown) are provided. Vehicle controller 29 can also be used for communicating with a master controller 72 (as shown in FIG. 7) for the ride system, which is preferably located off-track. The vehicle controller 29 preferably is provided with the software and hardware necessary to interface with the other on board systems. Such hardware may include analog-to-digital and digital-to-analog converters; binary functional switchable blocks and controls for brakes and seat restraints; seat orientation or tilt controllers; vehicle location pickup, velocity and/or acceleration sensing transducers; sound interface electronics; appropriate optical projection devices, and the like. The vehicle controller 29 can be conveniently mounted on the propulsion and control car 17'.

POWER DISTRIBUTION SYSTEM

Figure 6:
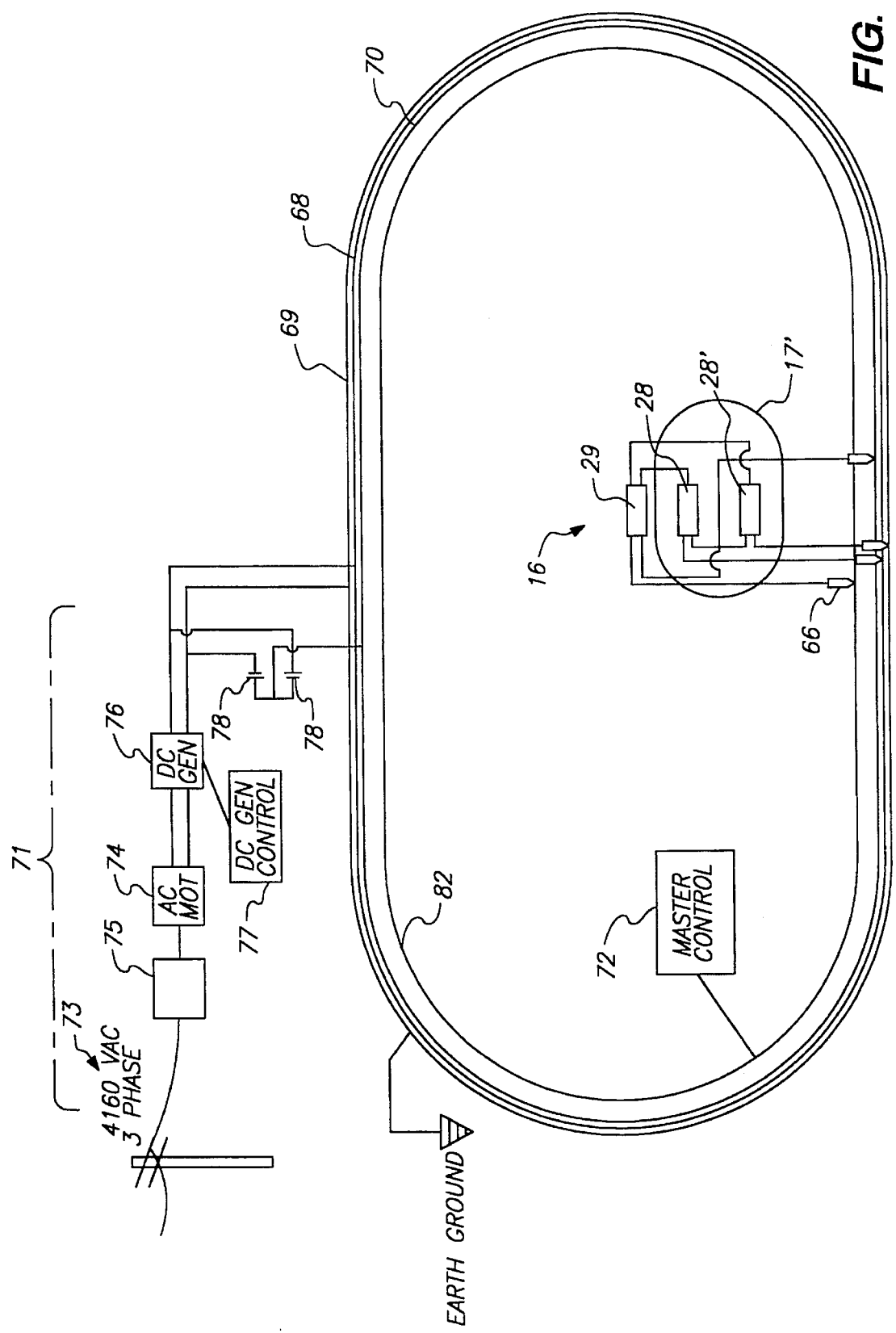
FIG. 6 provides a schematic illustration of an electric power system and master controller of the present invention.

The power distribution system is shown in FIGS. 6 and 7. In one embodiment of the track power source 71, DC power furnished to the drive vehicles 16 is developed using rotary equipment attached to electric utility service power lines 73. A ground-based, continuously rotating, synchronous AC motor 74, operating on typically three-phase, 60 hertz at 4,160 VAC or 13,200 VAC, is connected shaft-to-shaft to a DC generator 76. A solid-state voltage regulator 77 would be used to control the amplitude of the DC voltage appearing across the output terminals of the DC generator 76. The output of DC generator 76 would connect to conductors disposed along the track, such as bus bars 68, 69.

A solid-state switching converter (not shown) could be used as an alternative to conventional rotary equipment. This solid state converter would typically employ a three-phase transformer with a suitable step-down ratio, like 4160 volts to 425 volts, driving a bank of three-phase, solid-state silicon controlled rectifiers (SCRs). The output of the rectifiers, with suitable filtering, would be connected to the bus bars 68, 69.

Regardless of whether solid-state conversion or rotary equipment is used, certain ground-based start-up, power-line switching, and metering switch-gear 75, familiar to one skilled in the art, would be highly desirable.

In the preferred embodiment shown in FIG. 6, electricity is supplied to the ride vehicles through three bus bars 68, 69, & 70 disposed along the track. Bus bar shoes 66 conduct power between the bus bars and motor controllers 28. A suitable motor controller and drive motor combination presently available is the SR180LC Brushless DC Motor and the CR20-300LC Brushless DC Drive motor, both manufactured by Unique Mobility of Golden, Colo. These particular devices are manufactured to operate at a nominal 190 volts DC.

To reduce the required current carrying capacity of bus bars 68, 69, 70, the motor controllers 28 & 28' associated with the two drive motors in a drive motor package pair are connected in series. This configuration halves the current requirements of the vehicle but doubles the voltage required across bus bars 68 & 69. The difference between the currents flowing through the paired motor controllers is small, but for safety reasons the connection between the controllers is tied to the vehicle frame and referenced to earth ground through a bus bar shoe to grounded bus bar 70. The reference to earth ground is commonly provided by the connection of bus bar 70 to a metal water pipe or to a 10 foot long copper plated rod driven into the ground. In this configuration, bus bars 68 & 69 are plus and minus 190 volt DC supply lines. The grounded bus bar 70 is a nominal return line, but since the loads on both bus bars 68 & 69 are significantly balanced by virtue of the motor controllers acting on like control signals, little if any current flows through bus bar 70.

With a pair of motor controllers connected to one power source, it is important to maintain the same voltage across the power connections of each motor controller. To maintain a like voltage on each motor controller, two separate batteries 78 are used as voltage regulators.

In an alternative embodiment, drive motors and motor controllers would be specifically designed for higher voltage operation (e.g. 380–400 volts DC). As such motors and controllers become available in the future, the battery units 78 can be eliminated. Bus bars 68, 69 in this embodiment would provide a 400 volt supply and return. The return would be ground referenced at the generator, but have no electrical connection to the vehicle frame (only to the motor controllers). The grounded bus bar 70 would still provide the safety ground reference for the vehicle frame. In this configuration, all motor controllers would be connected in parallel (not shown).

The motor controller 28 controls both the magnitude of motor torque as well as the direction of torque required from the vehicle's drive motors 27. The vehicle controller 29 can send a torque control signal indicating the torque required. In one embodiment this torque control signal is a DC analog voltage from −10 to 10 volts. At times a torque control signal (e.g. 0 to +10 volts) will be sent to indicate a positive torque to accelerate in the forward direction; at other times, the vehicle controller 29 will send a torque control signal (e.g. 0 to −10 volts) to indicate negative torque for reverse acceleration. Alternatively, a speed control signal may be used in place of a torque control signal.

In one embodiment of the drive motor 27 and motor controller 28, shaft position sensors (typically Hall effect devices) are mounted on the housing of each drive motor 27 housing. These shaft position sensors measure the instantaneous position of the rotor with respect to the stator. This information is transmitted to each of the respective motor controllers 28 for each drive motor 27.

Each motor controller 28 processes the torque control and shaft position signals to establish the appropriate times for current to flow through the drive motor windings.

It is preferred that the vehicle operate at different times both to consume and to regenerate electric power. The consumptive mode describes vehicle operation when electric energy is drawn from the track power source 71, through the bus bar 68, 69, and into the vehicle 16 or vehicles. The regenerative mode describes vehicle operation when electrical energy flows from the vehicle 16, back through the bus bars 68, 69, and into the track power source 71.

In the consumptive mode, the drive motors 27 are requested to accelerate the vehicle 16 or move it up an incline. Electric energy from the track power source 71 is converted by the vehicle into mechanical energy. In the consumptive mode, DC current is regulated by the motor controllers to flow from the bus bars 68, 69 into the windings of the drive motors 27.

In the regenerative mode, the drive motors 27 are requested to decelerate a vehicle 16 or move it down an incline. Mechanical energy (kinetic and potential) will be removed from the vehicle 16. In regenerative mode, DC current flow is regulated by the motor controllers 28 to flow from the windings of the drive motors 27 into the bus bars 68, 69.

In the preferred embodiment using ground-based rotary equipment 74, 76, current flowing into the bus bars 68, 69 from the drive motors 27 simply flows into the DC generator 76, causing the DC generator 76 to act as a DC motor. When the DC generator 76 acts as a DC motor, it develops a usable shaft output torque, trying to drive the synchronous AC motor 74 faster than the synchronous line rate. However, an AC synchronous motor will try to rotate at the same synchronous speed, over their useful power range, independent of shaft loading. In fact, in the normal operating region of synchronous motor 74, the frequency of the incoming utility service power lines 73, 60 hertz, is the only factor which determines its speed. Since the speed of the AC synchronous motor 74 cannot change, the torque output from the DC generator 76 acting as a motor will cause the AC motor 74 to become an AC generator. When acting as an AC generator, the AC motor 74 will put energy back into the electric utility service power lines 73, rather than taking energy from the line.

In order to provide for reasonable voltage regulation at the output of the DC generator 76, the voltage regulator 77 is also used to control the performance of the DC generator 76 when acting as a DC motor.

In the alternative embodiment using ground-based solid-state power converters (not shown), additionally provided solid-state equipment will sense current flowing into the bus bars 68, 69 from the drive motors 27. Sensing this reverse current flow would switch the SCR bank from being continuously on to being pulsed on. The pulses are arranged so that current flows into the secondary of the step-down transformer previously used to drive the SCR's. This flow causes a current flow in the transformer's primary. The phase of the switching times and the conduction angles are carefully controlled to generate three phase back induced power in proper phase with the 60 hertz utility supplied power.

In the embodiment shown in FIG. 7, multiple ground-based track power sources 71 can be used. The AC synchronous motors 75 would all be connected in parallel to the same utility service primary lines 73. When a number of vehicles 16 are on the track, some vehicles 16 will be in consumption mode while others will be regeneration mode.

Power loss due to wheel and bearing friction, gearing losses, windage, electrical resistance, eddy currents, transformer hysteresis, etc. is typically unavoidable. Because of this, over time, an amusement ride will always draw energy from the utility service power lines. However, careful arrangement of the track pattern (especially elevation), sequence of the vehicle show events (accelerations, braking, etc.), vehicle count and intervehicular spacing, can create a simultaneous mix of vehicles operating in consumptive and regenerative modes. A consistent mixture would limit the peak required utility power and maintain continuous required power at a relatively constant level.

Furthermore, by re-using the regenerated energy rather than dumping it as waste heat in friction brakes, a substantial energy costs savings for the ride is realized. In fact, using the measured efficiencies on the vehicles for the drive motor package and the motor controller, and including wheel loss, efficiencies of about 88% are predicted. This means as much as a 77% recovery of all vehicle energy used, which represents a like savings on the electric bill for a similar ride vehicle which does not use energy-regenerating drive motors.

While, in the preferred embodiment, electric bus bars 64 are used to provide a source of electricity along the track and electric bus bar shoes 66 are mounted on the vehicle and used to pick up and conduct the electricity to the drive motors and motor controllers, there are other ways of achieving this result. For example, electricity could be provided to and conducted through the rails, and a conductive wire, wiper, or wheel used as a pickup.

MASTER CONTROLLER

The master ride controller 72, shown in FIGS. 6 and 7 is used to achieve precision control of multiple vehicles to allow faster dispatch and shorter intervehicular spacings by an implementation of floating zone control. A "floating zone" is a predetermined spacing for each vehicle which can change depending on a number of factors such as, but not limited to, location and speed. This is quite different from fixed zone control, whereby, through the use of zone brakes or other retarding structures, only one vehicle at a time is permitted to be on a particular, predetermined section of track. With floating zone control, more than one vehicle can occupy the same general section of track if the spacing between the vehicles permits adequate distance to safely and controllably stop the vehicle.

Communications System

To control the vehicles, the master controller 72 preferably communicates bi-directionally with each vehicle controller 29. Communications can be achieved using conventional methods such as, for example, a ground transmitter/receiver operatively connected to master controller 72 and transmitting through an auxiliary bus bar communications circuit 82 as shown in FIGS. 6 and 7 to communicate with a transmitter/receiver operatively connected to the vehicle controller 29 on each vehicle. Radio, optical visual and IR transmission (not shown) could also be used. A wide-band frequency-modulation (FM) communications link is preferably used because of its excellent immunity to man-made noise compared to other modulation forms. Using the communications system, the master controller 72 can coordinate the movement of multiple vehicles on the track by querying each vehicle 16 to determine its precise position on the track, speed, and direction of travel. Each vehicle is preferably assigned a unique address, so that communications from different vehicles do not interfere with each other. With a unique address, each vehicle controller 29 can determine when it is being queried, and can operate its transmitter/receiver to receive the query and furnish the desired response. Instructions can be transmitted to each vehicle to speed up, slow down, reverse direction, or take alternate routes. Master controller 72 can be programmed to begin safe shutdown procedures if a response to a query is not received after a certain period of time. Likewise, the vehicle controller 29 can implement a shut down procedure if a signal from the master controller 72 is lost, or if a communication from the master controller 72 is not received within a predetermined period of time following the last communication.

The master controller 72 can be important for taking full advantage of the energy regenerating feature of this amusement ride. By controlling the spacing and location of vehicles, the master controller 72 can minimize overall electricity consumption by assuring that some of the vehicles are generating electricity while others are consuming the electricity being generated (the difference being made up by energy from the track power source 71, as explained in detail above). This provides an amusement ride system which is extremely energy efficient.

OPERATION OF THE PREFERRED EMBODIMENT

The components described in detail above can be combined to provide a self-propelled amusement ride system which provides the same or a superior level of thrill to that achieved in a conventional roller coaster on a coaster track which can be provided with a smaller footprint than that required for a conventional coaster, and without the need for lift hills.

The amusement ride and ride vehicle of the present invention will permit a new experience not previously available in coaster-like thrill rides: the ability to apply reverse propulsion to generate high performance, controlled maneuvers in reverse. For example, a preferred amusement ride of the present invention should enable a rider to experience thrills quite different and unexpected such as, for example: going fast up steep to vertical slopes and going slow down a vertical or near-vertical drop; stopping while going down a steep slope, reversing and going backwards at a high speed; accelerating downhill towards an end of the track which looms over an abyss, stopping in the nick of time at the very end of the track, and accelerating in reverse to "save" the passengers. Additionally, the ability to generate electricity during deceleration or downhill travel will permit significant energy savings which will provide an economical self-propelled ride vehicle.

In operation, a vehicle 16 of the present invention, as shown in FIG. 1, is driven to a loading platform where passengers seat themselves in the seats. A restraining system is activated to secure the passengers in their seats before the vehicle enters the active area of the track, and is continuously monitored by the vehicle controller. If the restraining system fails, the vehicle controller can be programmed to execute safe shut down procedures and to communicate this action to the master controller so that the other vehicles on the track can be slowed, stopped or routed around the disabled vehicle until the restraining system is reactivated or the vehicle is removed from the active area of the track.

The loaded vehicle proceeds to a gate for entry onto the active track. The master controller 72 directs the vehicle controller 29 to proceed, and will provide route, speed and direction information throughout the ride so that the vehicle will follow a predetermined route at predetermined speeds. The vehicle controller 29 instructs the motor controllers to obtain the appropriate speed and direction of rotation of the drive wheels 50, 50' to move the vehicle in the manner desired. Location of the vehicle on the track can be monitored by the vehicle controller, and this information is conveyed to the master controller 72. During the ride, if adjustable seats have been provided, the passengers can change the orientation of the seats relative to the frame 18, and thus increase or decrease the "thrill" experienced when the vehicle traverses vertical, horizontal or compound curves. During the ride, the speed of the vehicle can vary from very fast, when thrill is desired, to very slow, when it is desired to allow the passengers to view displays, show elements, characters associated with the "theme" of the ride, or the like disposed along the path. Also, vehicle programming can be changed dynamically to vary the show seen by individual vehicles on the track system.

When the ride is complete, the vehicle can be directed by the master controller 72 to an unloading area, where the restraining system is disengaged and passengers can disembark.

The concept of the present invention can also be applied to other kinds of vehicles employing pinch wheel drive systems of the present invention. Such vehicles may, but need not, be track mounted. For example, it would be possible to construct a vehicle having load bearing wheels adapted to travel on a roadway, along with pinch wheel drive systems as described in detail above, for engagement with a drive fin extending up from the surface of the roadway, suspended above the roadway, or extending along one or both sides of the roadway.

The invention has been described in terms of the preferred embodiment. One skilled in the art will recognize that it would be possible to construct the elements of the present invention from a variety of materials and to modify the placement of the components in a variety of ways. While the preferred embodiments have been described in detail and shown in the accompanying drawings, it will be evident that various further modifications are possible without departing from the scope of the invention as set forth in the following claims.

What is claimed is:

1. A high performance amusement ride having a self-propelled ride vehicle capable of maximum acceleration of between about 0.3 G and about 1.0 G in either a forward or reverse direction, said amusement ride comprising:

a track having two substantially parallel, spaced apart load bearing rails and a substantially continuous drive fin mounted along said load bearing rails, said drive fin having a first and a second vertical tractive surface, said first and second tractive surfaces being substantially flat and substantially parallel to each other, said track being provided with at least one vertical, horizontal, or compound curve;

an electric power source disposed along said track; and, at least one vehicle mounted for movement-along said track, said vehicle including a frame, at least one passenger compartment attached to said frame, a plurality of load bearing wheels for engaging said load bearing rails of said track, an electric pinch wheel drive for engaging and accelerating the vehicle above 0.3 G along the drive fin, said electric pinch wheel drive including a first electric drive motor package pivotally mounted to said vehicle to engage said first tractive surface of said drive fin, a second electric drive motor package pivotally mounted to said vehicle to engage said second tractive surface of said drive fin, each said drive motor package having an electric motor with a motor output shaft which can rotate with substantially equal performance in either a clockwise or a counterclockwise direction, a transmission means for reducing the speed of the motor output shaft, a wheel attached for rotation to a transmission output shaft, said wheel including a tire for engaging said tractive surface, a compressive coupler for simultaneously compressing the tire of the first electric drive motor package against the first tractive surface and the tire of the second electric drive motor package against the second tractive surface with sufficient force to enable the electric drive motor packages to move the vehicle along the fin, whereby the amount of compressive force generated by said compressive coupler is substantially independent of vehicle weight; and, a motor controller electrically connected to each said motor for controlling the direction and speed of each motor output shaft;

a vehicle controller for determining the position of the vehicle on the track and for communicating with and controlling the motor controllers; and, a conductor for drawing electrical power from the electric power source and delivering said electrical power to said electric drive motor packages, said motor controllers, and said vehicle controller.

2. The ride of claim 1 wherein a plurality of said ride vehicles are operated simultaneously on said track, and additionally comprising a master controller for communicating with said vehicle controller for each vehicle to coordinate the movement of said vehicles on said track, whereby said ride can be operated in an economical, safe, and thrilling manner.

3. The ride of claim 1 wherein said drive fin is mounted between said load bearing rails such that the first and second tractive surfaces are substantially vertical and substantially perpendicular to a plane passing through a top surface of the load rails, and wherein the transmission output shaft of each said electric drive motor package extends vertically down from beneath said vehicle to position said attached wheel to engage said tractive surface of said drive fin.

4. The ride of claim 1 wherein the two electric drive motor packages are mounted directly opposite each other so that a plane passing through a central longitudinal axis of the transmission output shaft of both electric drive motor packages is substantially perpendicular to said first and second tractive surfaces.

5. The ride of claim 1 wherein said track is provided with at least one vertical curve having a slope of between about 17 degrees and about 90 degrees and wherein said pinch wheel drives have sufficiently high output to accelerate said vehicle in a range of about 0.3 G to about 1.0 G in either a forward or a reverse direction while said vehicle is traversing said vertical curve.

6. The ride of claim 1 wherein each said electric motor is a brushless, D.C. motor and wherein said electric power source includes a converter for converting incoming AC power into DC power compatible with said DC motors.

7. The ride of claim 6 wherein said electric drive motor packages include means for generating electrical energy and feeding said energy back into said electrical power source during deceleration or when vehicle motion is induced or enhanced by the force of gravity.

8. The ride of claim 4 wherein said compressive coupler is a spring assembly compressively linking each said first electric drive motor package to each said second electric drive motor package.

9. The ride of claim 8 wherein said spring assembly includes a means for selectively compressing or relaxing the spring to increase or decrease the compressive force urging said wheels of said first and second electric drive motor packages towards said drive fin.

10. The ride of claim 1 additionally comprising a cooling system for removing excess heat from the electric drive motor packages.

11. The ride of claim 3 additionally comprising a means for lubricating said transmission means.

12. The ride of claim 1 wherein said vehicle comprises a plurality of cars linked together by a shared axle, and wherein at least one electric pinch wheel drive per axle is provided.

13. The ride of claim 12 wherein each vehicle comprises two outside cars for passengers and one inside car for propulsion and control, each said outside car including a passenger compartment mounted above the frame, at least one seat for at least one passenger, and at least one electric pinch wheel drive mounted to engage said drive fin, and said inside car including a platform mounted on said frame on which is mounted each said motor controller, vehicle controller, conductor, and at least two said electric pinch wheel drives.

14. The ride of claim 13 wherein said electric power source is an electric bus bar mounted along said track, and said conductor is a bus bar pickup shoe suspended beneath said inside car and connected to said motor controllers and said vehicle controller by a wiring harness.

15. The ride of claim 13 wherein each said seat is selectively pivotable whereby seat position can be selected to increase or decrease the thrill experienced during acceleration.

16. The ride of claim 1 wherein said vehicle additionally includes a plurality of guide wheels for retaining the load bearing wheels on the tracks against lateral forces, and a plurality of up-stop wheels for retaining the load bearing wheels on the tracks against vertical forces.

17. The ride of claim 1 wherein said electric drive motor packages are pivotally mounted using a horizontally and vertically pivoting mount to enable each electric drive motor package to pivot horizontally and vertically with respect to the other electric motor drive packages, whereby said first and second electric motor drive packages will remain in substantial contact with said first and second tractive surfaces when said vehicle traverses said vertical, horizontal or compound curves.

18. The ride of claim 13 wherein each said electric motor is capable of continuously generating at least about 44 horsepower.

19. A high performance, self-propelled vehicle for movement along a pathway having a first vertical tractive drive surface and a second vertical tractive drive surface disposed along substantially the entire pathway, said first and second tractive drive surfaces being substantially flat and substantially parallel to each other, and a source of electric power disposed along the pathway for use by the vehicle, said vehicle comprising:

a frame;

a passenger compartment attached to said frame;

a plurality of load bearing wheels for supporting the vehicle on said pathway;

at least one electric pinch wheel drive for engaging said vertical tractive drive surfaces and accelerating said vehicle above 0.3 G along said path, said electric pinch wheel drive including a first electric drive motor package mounted to engage said first tractive drive surface, a second electric drive motor package mounted to engage said second tractive drive surface, each said electric drive motor package having an electric motor capable of continuously generating at least about 44 horsepower, and including a motor output shaft which can rotate with substantially equal performance in a clockwise and a counterclockwise direction, a transmission for reducing the speed of the motor output shaft, said transmission including a transmission output shaft, and a wheel having a tractive surface attached for rotation to said transmission output shaft, a compressive coupler for forcing the tractive wheel surface of said first electric drive motor package against said first tractive drive surface, and for forcing the tractive wheel surface of said second electric drive motor package against said second tractive drive surface with sufficient force to enable the pinch wheel drive to move the vehicle along the path, a motor controller electrically connected to each said electric motor for controlling the direction and speed of each motor output shaft, a vehicle controller electrically connected to said motor controllers for coordinating and controlling the motor controllers; and, a conductor for drawing electrical power from the electric power source and delivering said electrical power to said vehicle controller, motor controllers, and electric pinch wheel drive.

20. The vehicle of claim 19 comprising a plurality of cars linked together by a shared axle, and wherein at least one electric pinch wheel drive is provided for each axle on said vehicle.

21. The vehicle of claim 19 wherein said electric drive motor packages are pivotally mounted to said frame for independent vertical and horizontal movement.

22. The vehicle of claim 20 wherein the pathway includes a single drive fin centered on and extending substantially the entire length of the pathway, and wherein the first tractive drive surface is located on a first side of the drive fin and wherein the second tractive drive surface is located on a second side of the drive fin, and wherein said first and second electric motor drive packages are mounted whereby when said vehicle is placed on said pathway for movement, said first electric drive motor package will engage the first side of the drive fin and said second electric drive motor package will engage the second side of the drive fin.

23. The vehicle of claim 22 wherein said first electric drive motor package of each electric pinch wheel drive is mounted opposite said second electric drive motor package so that a plane connecting a central longitudinal axis of the transmission output shaft of both said first and second electric motor drive packages is substantially perpendicular to the sides of the drive fin.

24. The vehicle of claim 23 wherein said electric drive motor packages are mounted to extend from the frame towards the pathway.

25. The vehicle of claim 23 wherein said compressive coupler is a spring assembly linking said first and second electric drive motor packages and urging said tractive wheel surface of said first electric drive motor package and said tractive wheel surface of said second electric drive motor package towards the drive fin when said vehicle is placed on the pathway for movement.

26. The vehicle of claim 25 wherein said spring assembly includes a means for selectively compressing or relaxing the spring to increase or decrease the compressive force urging said tractive wheel surfaces of said first and second electric drive motor packages towards the drive fin.

27. The vehicle of claim 19 wherein said motor of each said electric drive motor package is a brushless, D.C. motor and wherein said electric power source includes a means for converting incoming AC power into DC power compatible with said D.C. motors.

28. The vehicle of claim 27 wherein each said electric drive motor package includes means for generating electrical energy and feeding said energy back into said electrical power source during deceleration or when vehicle motion is induced or enhanced by the force of gravity.

29. The vehicle of claim 19 additionally comprising a cooling system for removing excess heat from the electric drive motor packages.

30. The vehicle of claim 22 wherein said electric drive motor packages are mounted to orient said transmission shafts in a substantially vertical position and additionally comprising a means for lubricating said transmission.

31. The vehicle of claim 20 wherein each vehicle comprises a first and a second outside cars for passengers and one inside car for propulsion and control, each said outside car having
an axle
a passenger compartment mounted above said frame and including at least one seat for at least one passenger
an electric pinch wheel drive mounted adjacent to said axle beneath said frame to engage said drive fin said inside car being connected at a first end to said first outside car and being connected at a second end to said second outside car, said inside car having
a first axle at said first end,
a second axle at said second end,
a first electric pinch wheel drive mounted beneath said frame adjacent to said first axle,
a second electric pinch wheel drive mounted beneath said frame adjacent to said second axle, and,
a platform on said frame to which is mounted said motor controllers, said vehicle controller, and said conductor, whereby said vehicle can be accelerated selectively in a forward or in a reverse direction to between at least about 0.3 G and 1.0 G.

32. The vehicle of claim 31 wherein the pathway comprises a railway having two substantially parallel, spaced apart load bearing tracks provided with horizontal, vertical and compound curves, and wherein said load bearing wheels are shaped to conform to the load bearing tracks, whereby acceleration can be selectively generated while said vehicle is traversing the horizontal, vertical and compound curves.

33. The vehicle of claim 32 additionally including a plurality of guide wheels for retaining the load bearing wheels on the tracks against lateral forces, and a plurality of up-stop wheels for retaining the load bearing wheels on the tracks against vertical forces.

34. The vehicle of claim 32 wherein said electric power source is an electric bus bar mounted along said track, and said conductor is a bus bar pickup shoe suspended beneath said inside car and connected to said motor controllers and said vehicle controller by a wiring harness.

35. The vehicle of claim 31 wherein each said seat is selectively pivotable whereby the orientation of the seat relative to said frame can be selected to increase or decrease the thrill experienced during acceleration.

36. A high performance amusement ride having a self-propelled ride vehicle capable of selectively accelerating to between about 0.3 G and about 1.0 G in either a forward or a reverse direction, said amusement ride comprising:

a railway having two substantially parallel, spaced apart load bearing tracks and a substantially continuous drive fin mounted along said load bearing tracks, said drive fin having a first and a second vertical side, each said side being substantially flat and extending in a plane which is substantially parallel to the other side, and substantially perpendicular to a plane passing through a top surface of both load bearing tracks, said railway being provided with a plurality of vertical, horizontal, and compound curves;

an direct current (DC) electric power source disposed along said railway; and, at least one vehicle mounted for movement on said railway, said vehicle including a frame, at least one passenger compartment attached to said frame, a plurality of load bearing wheels for engaging said load bearing tracks of said railway, at least one electric pinch wheel drive system for each axle used on said vehicle for engaging said vertical sides of said drive fin and accelerating said vehicle above 0.3 G on said load bearing tracks, said electric pinch wheel drive system including a first electric motor drive pivotally mounted to said frame and disposed on said first side of said drive fin and a second electric motor drive pivotally mounted to said frame and disposed on said second side of said drive fin, each said motor drive having an direct current (DC) electric motor capable of continuously generating at least about 44 horsepower, and including a motor output shaft which can rotate with substantially equal performance in either a clockwise or a counterclockwise direction, a transmission for reducing the speed of the motor output shaft, and, a wheel attached for rotation to a transmission output shaft, said wheel including a tractive wheel surface for engaging the drive fin, a compressive coupler for simultaneously forcing the tractive wheel surface of the first electric motor drive against the first side of the fin, and the tractive wheel surface of the second electric motor drive against the second side of the fin with sufficient force to enable the electric motor drives to move the vehicle on the load bearing tracks, and, a motor controller for controlling the direction and speed of each motor output shaft, a vehicle controller communicating with and controlling the motor controllers for controlling the movement of the vehicle on the load bearing tracks, and, a conductor for drawing electrical power from the electric power source and delivering said electrical power to said electric pinch wheel drive system and said vehicle controller.

37. A high performance amusement ride having a self-propelled vehicle capable of maximum acceleration greater than 0.3 G, said amusement ride comprising:

a track having at least one load rail and at least a first and a second vertical tractive surface, said tractive surface being substantially flat, said track having at least one curve in any direction;

at least one electrical conductor disposed along the track;

a vehicle having at least one passenger compartment, a plurality of wheels engaging the load rail to keep the vehicle on the track, an electric drive means for engaging the vertical tractive surfaces and providing a maximum thrust greater than 0.3 G, and, a power pickup in contact with the electrical conductor for conducting electrical power to the electric drive system.

38. The ride of claim 37 wherein the electric drive means moves the vehicle with substantially equal performance along the track in either a forward or a reverse direction.

39. The ride of claim 37 additionally comprising at least one drive fin and wherein said first tractive surface is located on a first side of said drive fin, and said second tractive surface is located on a second side of said drive fin.

40. The ride of claim 37 additionally comprising a first and a second drive fins, and wherein said first tractive surface is located on said first drive fin and wherein said second tractive surface is located on said second drive fin.

41. The ride of claim 39 wherein the electric drive means comprises a plurality of electric drive motor packages disposed in pairs along the vehicle, the first electric drive motor package of each pair engaging said first tractive surface, the second drive motor package of each pair engaging said second tractive surface, and a compressive coupler drawing the first and second drive motor packages towards the drive fin with substantially equal force.

42. The ride of claim 39 wherein said tractive surfaces are perpendicular to a plane passing through a top surface of said load rail.

43. The ride of claim 39 wherein said drive fin is mounted beneath said load rail.

44. The ride of claim 37 wherein said tractive surface is provided on said load rail.

45. The ride of claim 37 wherein said passenger compartment is mounted on a platform and wherein said vehicle additionally includes a means for selectively pivoting said platform.

46. The ride of claim 45 wherein said pivoting is controlled by a vehicle controller.

47. The ride of claim 46 wherein said pivoting is controlled by a passenger.

48. The ride of claim 41 wherein said wheels are supported for rotation on a plurality of axles, and at least one electric drive motor package pair is provided for each axle.

49. The ride of claim 48 wherein each electric drive motor package includes an electric motor capable of continuously generating at least about 44 horsepower, a motor output shaft which can rotate with substantially equal performance in a clockwise and a counterclockwise direction, a transmission for reducing the speed of the motor output shaft, said transmission including a transmission output shaft, and a wheel having a tractive surface attached for rotation to said transmission output shaft.

50. The ride of claim 49 wherein said tractive surface is formed by molding a resilient polymeric layer on an outer surface of said wheel.

51. A transportation system including a vehicle capable of maximum acceleration greater than 0.3 G, said transportation system comprising:

a railway having a substantially flat vertical tractive drive surface extending along substantially the entire length of the railway;

a source of electrical power disposed along said railway;

a vehicle mounted for movement on the railway and having a passenger compartment, an electric drive means for engaging the vertical tractive surface and accelerating the vehicle above about 0.3 G along the railway, and a conductor for connecting said source of electrical power to said electric drive means;

and wherein said source of electrical power furnishes electricity which is compatible to that required by said electric drive means.

52. The transportation system of claim 51 wherein said electric drive means includes an electric pinch wheel drive system having DC motors which each generate at least 44 horsepower.

53. The transportation system of claim 52 wherein said railway includes at least one curve in any direction, and in which said electric drive means additionally include a means for following said tractive drive surface through said curve.

54. The transportation system of claim 53 wherein said means for following said tractive drive surface includes a pivoting mount for mounting said pinch wheel drive system for movement in a horizontal and a vertical plane.

* * * * *